United States Patent Office 2,861,870
Patented Nov. 25, 1958

2,861,870

MANUFACTURE OF HYDROGEN CYANIDE

Alden J. Deyrup, Niagara Falls, Edward W. Heiderich, Lewiston, and Harvey E. Wagoner, Niagara Falls, N. Y., assignors to E. I. du Pont de Nemours & Company, Wilmington, Del., a corporation of Delaware No Drawing. Application October 16, 1952
Serial No. 315,194

11 Claims. (Cl. 23—151)

This invention relates to the synthesis of hydrogen cyanide by reaction between ammonia and a carbonaceous material such as methane or natural gas.

It is well-known that hydrocyanic acid can be produced by heating ammonia with carbon compounds in the gaseous or vapor state. The reactions occurring are strongly endothermic and require quantities of heat supplied at relatively high temperatures. As a consequence the direct reactions have been largely superseded by exothermic processes utilizing oxygen free or combined in some reactive form. Such processes are illustrated by those shown, for example, by the Andrussow Patent 1,934,838 and by the Lacy Patent 2,076,953. While oxygen is able to overcome the heat supply and control deficiencies noted, it places increased burdens upon the economics and technology of the system. In addition, although much work has been expended on syntheses utilizing oxygen or air, the conversions of $NH_3$ to HCN have not been raised above about 70%. the primary object of the present invention is, therefore, development of a process for producing hydrocyanic acid by direct interaction between ammonia and a carbonaceous gas. A second object of the invention is development of a process for producing hydrocyanic acid from ammonia and hydrocarbons in the substantial absence of oxygen-containing gases such as oxygen itself, nitric oxide and air.

It has been found that, if a carbonaceous gas such as natural gas or methane, the chief constituent of natural gas, ethane, ethylene or the like be reacted with ammonia at elevated temperatures in the presence of a platinum metal catalyst, hydrocyanic acid can be produced in good yield in the substantial absence of air, oxygen, other oxidizing gas or moisture. The equation for a typical reaction may be written as:

$$CH_4 + NH_3 \rightarrow HCN + 3H_2$$

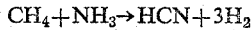

Approximately 60,000 calories must be supplied to the reactants of this equation for each mole of HCN formed and may be introduced into the system either directly as by a flame playing on the catalyst employed or indirectly by means which will be described hereinafter. The temperatures required vary within a range of from about 900° to about 1300° C. Higher temperatures tend to decompose ammonia to an undesirable extent while lower temperatures cause the reaction to proceed at an impracticably slow rate. In practice the carbonaceous gas, preferably methane, is mixed with somewhat more than the stoichiometric quantity of ammonia and passed through a reaction zone containing the catalyst bed held within the 900°–1300° C. temperature range. The effluent gases are then cooled and product HCN separated from the resultant gaseous mixture which generally includes unreacted $CH_4$ and $NH_3$, $H_2$ and $N_2$ as well as HCN. $CH_4$ and $NH_3$ may be mixed together in calculated proportion either prior to their entry into the catalyst bed or in the bed itself. Separation of HCN from other off-gases may be carried out in any known manner, as by absorption in caustic.

The catalysts of this invention are the noble metals of the platinum group, i. e. platinum itself, ruthenium, rhodium, palladium, osmium and iridium and the alloys of these metals, utilized as a bed held within a reaction zone. The catalysts may be employed in the massive form, as for example in the embodiment of wire, sponge, gauze or other element exhibiting a convenient surface. Preferably the noble metal in a finely divided form is supported on a heat-resistant non-metallic material such as silica, silicates, carborundum, alumina or the like. A suitable catalyst can be made up from a platinum-rhodium alloy on beryl as shown by U. S. Patent 2,381,344.

The supply of heat to the endothermic reaction presents a problem, particularly since control of temperature is important in securing an effective reaction. One method of providing heat is directly and continuously by means of a flame playing onto a reactor defining internally the reaction zone. Within the reactor is positioned a bed of the catalyst being employed, for example a platinum-rhodium alloy supported on beryl. Through the reactor and the heated reaction zone is passed continuously a mixture of methane or other carbonaceous gas and ammonia. Temperatures between about 900° C. and 1200–1300° C. may be maintained in this manner, the higher temperatures between 1200 and 1300° C. being preferred since they give improved yields. Because of the poor thermal conductivity of the beryl, a temperature drop of 300–400° C. may be expected between the circumference and the center of a catalyst bed two inches in diameter. This temperature drop naturally affects adversely the desired conversion rates. Generation of the heat in situ by induction affords a means of overcoming difficulties in heat transfer, but the cost of electric power renders all electrical heating uneconomical.

Where problems involving the continuous transfer of heat exist in the embodiments of the present synthesis, the feed velocity of the $CH_4$—$NH_3$ mixtures is of great importance. This velocity may vary between about 1,500 and 20,000 V./V./H. Because of the difficulties in maintaining an adequate reaction temperature, the lower values between 1,500 and about 4,500 V./V./H. are preferred. In this connection the abbreviation V./V./H. possesses its usual significance, that is, the volume of fluid passing through a unit volume of catalyst in an hour. Of somewhat less importance than feed rate in the direct heat modes of operating this invention is the ratio of methane to ammonia in the input gases. The theoretical ratio is of course 1:1. A slight excess of ammonia, however, seems to enhance the conversion, possibly because some ammonia is lost through decomposition into its elements. For this reason a $CH_4$:$NH_3$ ratio of about 0.7–0.9:1 is preferred. Mixtures with ratios varying between 0.5:1 and 1.5:1 may be utilized but extreme ratios tend to waste one of the components. The pressure of the reacting system is not of critical importance. Ambient or even sub-atmospheric pressures may be employed. Elevated pressures raise the same difficulties concerning heat transfer that are found at high input space velocities. Atmospheric pressure is satisfactory and, since it is convenient, is preferred.

Under the conditions for continuous heating set forth above conversions of 55–60% of the ammonia utilized to hydrocyanic acid are possible. Ammonia decomposition to nitrogen and hydrogen varies between 5 and 35%, averaging between 15 and 25%. Practically no sooting or breakdown of the methane to carbon occurs at any of the temperatures utilized. The input velocity of the reactants must, however, be held to relatively low rates because of the difficulties in transferring heat through the catalyst. This difficulty can be obviated to some extent by preheating the reactants but a process utilizing periodic heating is preferred and will now be described.

In the preferred embodiment of our invention the flow of the reactant gases methane and ammonia is periodically interrupted and a second gaseous mixture passed through the reaction zone. This second mixture consists of methane or other combustible gas and air or oxygen. The combustible mixture is ignited by a flame outside the reaction zone or by the elevated temperature of the catalyst bed itself. The methane burns in the reaction bed and heats the latter to the preferred maximum temperature for the methane-ammonia reaction. When the desired temperature is reached, oxygen feed is stopped, the flow of the reactant gases is resumed and the synthesis of HCN carried out until the temperature of the catalyst falls too far below that preferred. When the temperature has reached too low a value, heating is again performed.

Burning of the combustible gas according to the principles of this invention may be termed the heat phase of a cyclic reaction process, while the synthesis of the hydrogen cyanide may be referred to as the make phase. One heat phase and its subsequent make phase form one complete reaction cycle. The entire make and heat cycle may be established for a definite period of time with a definite ratio between the lengths of the two phases. The cycles are repeated continually for a predetermined time with the make and heat phases alternating in the manner described.

It will be evident to those skilled in the art that the cyclic process is applicable to any catalyzed endothermal reaction between fluids. In the general application of the process a bed of the requisite catalyst, held within a reaction zone, is first heated to a desired reaction temperature in the heat phase of the cycle. The endothermic reaction is then accomplished in a make phase. The temperature within the catalyst bed fluctuates about a mean which should be the preferred temperature for the endothermic reaction. In practice the heat phase will usually exceed in duration the make phase. Since, however, the make phase produces the desired product, it will be considered the dominant portion of the cycle. The process will then be spoken of as a make and heat, rather than heat and make, process carried out with periodic interruption of the reaction or the make phase.

Conditions under which effective operation of the cyclic process can be obtained differ somewhat from those found best for the continuous process. The temperatures required are, however, about the same in the two modes of operation and, broadly, determine the phase lengths that can be used. An over-all cycle of about ten seconds has been found effective with a combustion or heat phase lasting eight seconds and a reaction or make-phase of two seconds. A twenty second cycle with a four second reaction phase may also be employed. Still longer cycles may also be utilized, a make:heat time ratio of 1:4 being retained, however. By varying the rates of flow of the gases, specifically by increasing the rate of flow of the combustion gas, the ratio of the phases in the cycle can be changed. The values given, i. e. 1:4, were found convenient where the combustion gas was supplied at the pressure within commercial mains, that is at about atmospheric pressure.

As noted above, the temperatures suitable for use with the make-and-heat process are about the same as those required if direct heating is employed. Initial temperatures of 900°–1300° C. may be attained without difficulty during the heating phase of the cycle. Fluctuations of about 100–200° C. occur during the reaction phase. Thus in one example the temperature at the top of the catalyst bed was 1035° C. at the start of the make-phase but fell to a low of 955° C. at the end. No temperature-gradient between the edge and center of the catalyst bed exists where this form of heating is employed. As in the case of direct heating the lower temperatures, particularly below 900° C., tend to yield too slow a reaction while the higher tend to increase the decomposition of ammonia. The preferred range is 1050–1250° C.

Much higher input velocities may be used with the periodic heating. Thus space velocities between 1,500 and 50,000 V./V./H. are operative with the high range between 20,000–50,000 V./V./H. preferred. Still higher values, up to even 200,000–300,000 V./V./H. may be employed to secure greater productivity even at some sacrifice of conversion or yield. These velocities refer to the input rate of reactant gases to the reaction zone. The input velocities of the heating gases are not critical but as noted may be varied to change the length of the heat phase of the process. Surprisingly, no soot formation occurs at the reactant input rates given or at the temperatures employed. In any event soot deposited during the synthesis phase would be burnt out during the succeeding combustion phase.

The methane-ammonia molar ratios in the synthesis feed gases may be varied within limits. The range between 0.50 and 1.50 parts methane to one part ammonia has been employed. Ratios outside these limits tend to waste too much of one or the other of the reactants. A definite range for optimum conversion exists between the limits 0.7–0.9 mole of methane to 1 of ammonia, that is, $CH_4:NH_3$ ratios of 0.7–0.9:1. Outside these limits conversion rates fall off rapidly. These ratios vary only slightly with temperature and space velocity of the reactants. The figures given are, however, for a space velocity of 40,000 V./V./H. and a reactor temperature of 1165–1195° C. Such optima are not sharply observed when continuous heating is employed but may only be masked by the difficulties involved in heat transfer. The pressures of the gases are not critical and, as throughout this specification, are assumed to be atmospheric. The air:methane ratios for the heat phase of the cycle are also not particularly critical. It is of course desirable that enough oxygen be supplied with the air to oxidize completely the methane or other combustible gas but that the excess of inert but heat absorbing nitrogen be kept as small as possible. Air:methane ratios of between 7:1 and 14:1 have been used with 8:1–10:1 preferred since the latter satisfy the requirements just mentioned.

When the procedure given for the "make-and-heat" process is followed, conversions of up to 73% of ammonia to hydrocyanic acid may be obtained with ammonia destruction ranging between 5 and 30%. Under optimum operating conditions there result consistent conversions of 65–73%. On the average, ammonia destruction varies between 10 and 20%. In some cases ammonia is entirely absent in the off gases from the converter. Destruction of $NH_3$, however, prevents 100% conversion to HCN.

The invention may be understood in more detail from a consideration of the following examples, which are given solely by way of illustration and not by way of restriction.

EXAMPLE 1

A series of runs was made passing various known $CH_4$—$NH_3$ mixtures through about 10 cc. of a catalyst of platinum-rhodium alloy supported on beryl. The ratio of platinum to rhodium in the alloy was 80:20. Heat was supplied by means of a flame continuously playing on the reaction zone. The off-gases from the catalyst were analyzed for HCN content. Results are tabulated in Table I.

Table I

| Run | CH₄:NH₃ Feed Ratio | V./V./H. | Inner Bed Temp.,[1] °C. | NH₃ Flow, l./min. | Percent Conv. NH₃ to HCN | Percent NH₃ Decomp. |
|---|---|---|---|---|---|---|
| 1 | 0.70 | 16,000 | 960 | 1.74 | 25 | 17 |
| 2 | 1.0 | 18,000 | 990 | 1.50 | 55 | 11 |
| 3 | 1.4 | 18,000 | 995 | 1.25 | 40 | 24 |
| 4 | 0.82 | 18,000 | 1,000 | 1.60 | 40 | 25 |
| 5 | 0.8 | 1,850 | 1,175 | 0.22 | 61 | 33 |
| 6 | 0.8 | 4,620 | 1,185 | 0.22 | 60 | 26 |

[1] These temperatures are taken at the center of the catalyst bed. Temperatures at the edge of the bed were about 200°–400° C. higher than those shown.

EXAMPLE 2

Several runs were made using a 9.5 second make-and-heat cycle. The heat phase lasted about 7.6 seconds and the actual reaction time was about 1.9 seconds. Each entire run lasted about an hour. The catalyst bed employed was a two-inch bed of 80:20 platinum:rhodium alloy mounted on an 8 mesh beryl support. Temperatures employed in the make phase varied between 1100° and 1250° C. Results are given in Table II.

Table II

| Run | CH₄:NH₃ Feed Ratio | V./V./H. | Conversion of NH₃ (percent) | HCN Concentration in off gases (percent) |
|---|---|---|---|---|
| 7 | 0.65 | 41,000 | 56.8 | 19.3 |
| 8 | 0.85 | 39,000 | 68.5 | 20.5 |
| 9 | 0.95 | 42,000 | 52.5 | 16.9 |
| 10[1] | 0.80 | 20,000 | 73.0 | 20.7 |

[1] Run 10 employed a cycle time of 18.9 seconds, instead of 9.5 seconds, divided into a 14.6 second heat phase and 4.3 second reaction phase.

EXAMPLE 3

A methane and ammonia mixture with a CH₄:NH₃ ratio of 0.95 was passed through a catalyst bed one inch thick with a volume of 6 cc. The bed consisted of 80:20 Pt-Rh alloy supported on 8 mesh beryl. The 9.5 second cycle with a make:heat phase ratio of about 1:4 was employed for about one hour. The temptaure was at a maximum of 1195° C. at the beginning of the make phase and fell about 100° C. during the approximate two second duration of this phase. With a feed input of 3600 V./V./H. a 64% yield of HCN was obtained. 18% of the ammonia input was destroyed.

EXAMPLE 4

The run of Example 3 was substantially repeated except that a 50:50 Pt:Rh catalyst supported on 8 mesh beryl was employed with an 18.9 second make-and-heat cycle. Conversions of around 75% were obtained at the CH₄:NH₃ ratio of 0.8–1:1.

EXAMPLE 5

The run of Example 3 was substantially repeated except that a 25:75 Pt:Rh catalyst supported on 8 mesh beryl was employed with an 18.9 second make-and-heat cycle. Optimum conversions of 68–71% ammonia to hydrogen cyanide were obtained at CH₄:NH₃ ratios of 0.8–1.0:1. Ammonia decomposition averaged 20–25%.

Various modifications in our invention will be readily apparent to those skilled in the art. The catalyst employed, for example, need not be restricted to one of the Pt:Rh alloys exemplified. Other such alloys or in fact any of the platinum metals may be substituted for those shown. The mesh size and exact arrangement of the catalyst support are likewise matters in which immaterial changes may be made. Consequently, we wish to be bound solely by the appended claims.

We claim:

1. The process which comprises a first step of heating a catalyst bed containing a member of the platinum metals group and held within a reaction zone by burning a carbonaceous combustible gas therein, a second step of passing through said catalyst bed a gaseous mixture of ammonia and natural gas and thereby reacting said mixture to form hydrogen cyanide and a third step of repeating the first and second steps for a predetermined time.

2. The process of claim 1 in which the catalyst bed is heated to a temperature of 900°–1300° C.

3. The process which comprises a first step of heating a catalyst bed held within a reaction zone and containing a member of the platinum metals group to a temperature of 900–1300° C. by burning a carbonaceous combustible gas therein, a second step of passing through said catalyst bed an oxygen-free gaseous mixture of ammonia and a substantially saturated hydrocarbon and thereby reacting said mixture to form hydrogen cyanide, a third step of separating hydrogen cyanide from the gaseous mixture after the same has passed through the catalyst bed and a fourth step of alternately repeating the first and second steps for a predetermined time.

4. The process of claim 3 in which the catalyst bed contains platinum metal and the hydrocarbon consists substantially of methane.

5. The process of claim 4 in which the gaseous mixture possesses a methane:ammonia mole ratio of 0.7–0.9:1.

6. The process of claim 4 in which the catalyst is massive platinum metal.

7. The process of claim 4 in which the catalyst is a finely divided mixture of platinum and rhodium supported on chemically inert base.

8. The process of claim 4 in which the gaseous mixture is passed through the catalyst bed at a rate between about 20,000 and 50,000 V./V./H.

9. The process of making hydrogen cyanide which comprises a make step of passing an oxygen-free gaseous mixture of methane and ammonia with a CH₄:NH₃ mole ratio of 0.7–0.9:1 through a catalyst bed containing a platinum catalyst positioned within a reaction zone and maintained at a temperature of 1050–1250° C., a heat step of periodically interrupting the passage of the oxygen-free gaseous mixture through said catalyst bed and during the interruption burning a carbonaceous combustible gas therein, repeating the make and heat steps for a predetermined time and separating hydrogen cyanide from the product of the make step.

10. The process of claim 9 in which the durations of the heat and make steps are in definite ratio to maintain said temperature.

11. The process of claim 4 in which the duration of the heat step is about four times that of the make step.

References Cited in the file of this patent

UNITED STATES PATENTS

| | | |
|---|---|---|
| 1,144,457 | Beindl | June 29, 1915 |
| 1,351,859 | Lowe et al. | Sept. 7, 1920 |
| 1,934,838 | Andrussow | Nov. 14, 1933 |
| 2,057,282 | Tramm | Oct. 13, 1936 |
| 2,073,638 | Houdry | Mar. 16, 1937 |
| 2,076,953 | Lacy | Apr. 13, 1937 |
| 2,327,746 | Schultz | Aug. 24, 1943 |
| 2,596,507 | Perry | May 13, 1952 |